United States Patent [19]
Fussell, Jr. et al.

[11] 3,829,153
[45] Aug. 13, 1974

[54] BRACE AND METHOD OF BRACING A WINDSHIELD TO A DASHBOARD

[75] Inventors: Edward B. Fussell, Jr., Altamonte Springs, Fla.; Don L. Redmon, Nashville, Tenn.

[73] Assignee: Water Bonnet, Inc., Casselberry, Fla.

[22] Filed: Dec. 1, 1972

[21] Appl. No.: 311,378

[52] U.S. Cl. .................. 296/90, 9/1 R, 248/279, 248/357, 296/84 R
[51] Int. Cl. ............................................. B60j 1/04
[58] Field of Search ........ 296/84 R, 84 A, 84 N, 86, 296/87, 90; 9/1 R; 248/279, 285, 286, 351, 357

[56] References Cited
UNITED STATES PATENTS

| | | | |
|---|---|---|---|
| 776,881 | 12/1904 | Ambrose | 248/357 X |
| 834,503 | 10/1906 | Banker | 296/90 |
| 880,461 | 2/1908 | McGiffin et al. | 296/87 |
| 2,932,480 | 4/1960 | Hardy | 248/285 |
| 3,171,627 | 3/1965 | Tapley et al. | 248/357 X |
| 3,174,792 | 3/1965 | Demas | 296/87 |
| 3,336,612 | 8/1967 | Stevens | 9/1 R |

FOREIGN PATENTS OR APPLICATIONS

| | | | |
|---|---|---|---|
| 1,144,852 | 3/1969 | Great Britain | 296/84 R |
| 1,546,246 | 10/1968 | France | 296/84 R |

*Primary Examiner*—Robert J. Spar
*Assistant Examiner*—Leslie J. Paperner
*Attorney, Agent, or Firm*—D. Paul Weaver

[57] ABSTRACT

A brace, extending between a windshield and a dashboard that includes a stem interposed between the windshield and the dashboard. A dashboard bracket, connected to one end of the stem by a universal joint, is rigidly secured to the dashboard. A windshield bracket is rigidly secured to the windshield. A foot, secured to the other end of the stem by a universal joint, is brought into engagement with the windshield bracket and is rigidly connected to the windshield bracket in the position of engagement of the foot with the windshield bracket. Means are provided on the windshield bracket and foot so that the angle of the stem may be varied and the brace can therefore be used with different styles of boats.

9 Claims, 1 Drawing Figure

PATENTED AUG 13 1974
3,829,153
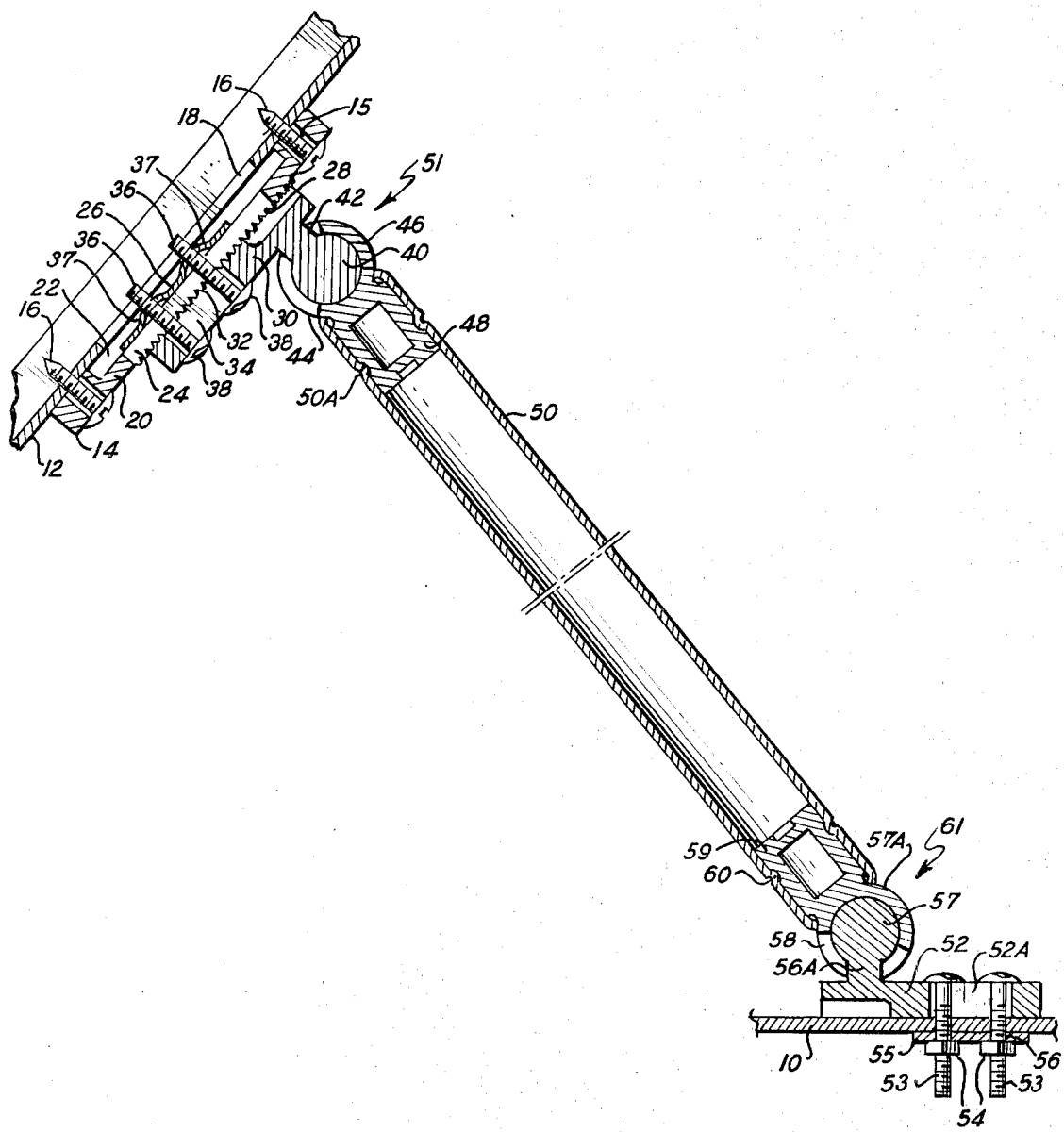

BRACE AND METHOD OF BRACING A WINDSHIELD TO A DASHBOARD

BACKGROUND OF THE INVENTION

In boats having walk-through windshields assembled to and extending away from a dashboard, it is standard practice to have a brace extending between and connected to the windshield and the dashboard to support the windshield adjacent the walk-through section. When the windshield is separately manufactured from the rest of the boat and is later assembled to the boat, the angle that the windshield makes with the deck varies from boat to boat and the contour of the dashboard varies from boat to boat. Therefore, difficulties arise in providing a brace that will be universal enough to acommodate itself to any given windshield-dashboard combination.

SUMMARY OF THE INVENTION

In this invention, the aforementioned problem is solved by forming the brace of a stem having a dashboard bracket connected to one end of the stem by a universal joint, the dashboard bracket being rigidly connected to the dashboard. A windshield bracket having positioning adjustment means is rigidly connected to the windshield. The other end of the stem is connected by a universal joint to a foot. The foot is brought into engagement with the windshield bracket and, after adjustment of the angle of the stem, is rigidly secured to the windshield bracket.

BRIEF DESCRIPTION OF THE DRAWING

The figure of the DRAWING is a cross-section of the windshield, the dashboard, and the brace interposed between and connected to the windshield and the dashboard.

DESCRIPTION OF PREFERRED EMBODIMENT

A boat (not shown) incorporates a dashboard section 10 and a windshield frame 12, the windshield frame 12 extending upwardly from the section 10 at an acute angle thereto. In boats having walk-through windshields, the windshields are usually made in three sections. Two of the sections are permanently attached to the boat, while the third section is disposed intermediate the first two sections and is hingedly connected to one of the sections for opening and closing movement so that persons in the boat can pass through the windshield area in going forward and will not have to climb over the windshield where a boat has a one-piece windshield. The portion of the windshield frame shown in the drawing represents an end of the windshield section adjacent the walk-through area. A windshield bracket 14 is mounted to the downwardly facing side of the windshield frame 12 by screws 16 passing through holes 15 so as to extend across a slot 18 in the frame 12. The bracket 14 includes a floor portion 20 that is separated from the frame 12 and the slot 18 by a space 22, the floor portion 20 having a slot 24 therethrough which is in registry with the slot 18. A nut plate 26, having bolt receiving openings 37, is located in the space 22 and is movable lengthwise of the space 22. The exterior of the floor portion 20, adjacent to the slot 24, has teeth 28 formed thereon.

A foot 30 has teeth 32 on its surface that are constructed to mesh with the teeth 28 and has a slot 34 formed therethrough intermediate its sides. A pair of bolts 36 have heads 38 of larger diameter than the width of the slot 34 so that a tightening of the bolts 34 in the nut plate 26 will clamp the floor portion 20 and the foot 30 in a selected position against each other with the teeth 28 and 32 in meshing engagement.

A ball 40 is integrally connected to the foot 30 by a shank 42. The ball 40 is swingably mounted in socket 44 which is provided with a slot 46, with the shank 42 being movable in the slot 46 of the socket 44. The socket 44 is also rotatable about the ball 40 along an axis that coincides with the axis of the shank 42. The socket 44 is integrally connected to a base 48 that is rotatably mounted in the top end of a hollow stem 50 or brace member as by swaging or staking shown at 50A. The members 40, 42, 44 and 48 form a joint, referred to generally as 51, which joint permits limited universal movement, between the foot 30 and the stem 50.

A dashboard bracket 52 having a slot 52A is anchored to the dashboard 10 by bolts 53 passing through slot 52A and nuts 54 threadedly engaged on the bolts 53. A plate 55, having apertures 56 through which bolts 54 pass, is interposed between the nuts 53 and the dashboard 10 to distribute the force applied to the dashboard when the nuts 53 are tightened. The bracket 52 has a shank 56A and a ball 57 integrally formed thereon to be received in a socket 57A. Socket 57A has a slot 58 (similar to slot 46 described above) and a base 59 (similar to base 48) that is rotatably mounted in the lower end of stem 50 by swaging or staking as at 60. This joint, generally referred to as 61, would have a limited universal movement similar to that of joint 51.

The other permanently installed section of the windshield frame 12 adjacent to the walk-through opening, is connected to the dashboard 10 by a brace identical to that shown in the drawing.

The brace of this invention is used to connect the windshield sections to the dashboard in situations wherein the windshield sections are separately manufactured and are later connected to the boat, with the configuration of the boat dashboard, and thus the precise area of attachment of the brace to the windshield frame, being variable.

With respect to attachment of one of the braces to one of the windshield sections of the boat, following assembly of the windshield section to the boat, the windshield bracket 14 is rigidly mounted to the windshield frame 12 by the screws 16 with the nut plate 26 located in the space 22. The dashboard bracket 52 is next bolted to the dashboard 10 by means of the bolts 53 and nuts 54. The stem 50 can then be manipulated about the joint 61 relative to the bracket 52 in a lateral direction (to accommodate for any misalignment of the dashboard bracket 52 with the windshield bracket 14) in a vertical direction, and by rotation of the stem, if desired. The foot 30 is then manipulated about the joint 51 relative to the stem 50 to bring teeth 32 into meshing engagement with the teeth 28. Because of the variable factors referred to above, the specific teeth 28 and 32 that engage each other will vary between one extreme position wherein the right end of the foot 30 is adjacent to the right screw 16 and the other extreme position wherein the left end of the foot 30 is adjacent the left screw 16. Further adjustment can be secured, if desired, by rotating ball 40 of foot 30 in socket 44 to a position which would be the reverse of that shown in the drawing or to positions intermediate thereof, and by angular movement of the foot 30 with respect to the slot 46. Regardless of the position of engagement of the teeth 28 and 32 between the two extreme positions, after the teeth have engaged each other, the bolts 36 are threaded into the nut plate 26 and tightened to rigidly secure the foot 30 to the windshield bracket 14 and thus rigidly brace the frame 12 of the windshield section to the dashboard 10. A similar procedure would be followed with respect to the bracing of the other permanetly installed windshield section, adjacent the walk-through area.

It will thus be seen that the brace provides a wide range of adjustment, whereby the brace can be utilized with a variety of different styles of boats, such adjustability being possible because of (1) the rotatable mounting of the sockets 44 and 57A with respect to the stem 50, (2) the rotatable mounting of the foot 30, (3) the fact that the foot 30 can be angularly adjusted by movement along slot 46, and (4) socket 57A is capable of angular and lateral adjustment. The brace could be used with other types of boat windshields, where appropriate.

We claim:

1. A brace for placement between a windshield and a dashboard comprising a stem to be interposed between the windshield and the dashboard, a dashboard bracket for securement to the dashboard, a first universal joint disposed between and interconnecting said dashboard bracket with one end of said stem, a windshield bracket for rigid securement to the windshield, a foot member, a second universal joint disposed between and interconnecting said foot member and the other end of said stem, and connection means between said foot member and said windshield bracket whereby said foot member can be rigidly connected to said windshield bracket in a selected adjusted position, said connection means including interengageable teeth on opposing faces of said windshield bracket and foot member, said windshield bracket including a floor portion separated by a space from said windshield, said teeth on said windshield bracket being formed on said floor portion, said connection means further including at least one nut located in said space, said foot member and said floor portion having registering slots formed therethrough, and at least one bolt extending through said slots and engaged with said nut.

2. A brace for placement between a windshield and a dashboard comprising a stem to be interposed between the windshield and the dashboard, a dashboard bracket for securement to the dashboard, a first universal joint disposed between and interconnecting said dashboard bracket with one end of said stem, a windshield bracket for rigid securement to the windshield, a foot member, a second universal joint disposed between and interconnecting said foot member and the other end of said stem, and connection means between said foot member and said windshield bracket whereby said foot member can be rigidly connected to said windshield bracket in a selected one of a plurality of positions of engagement, said second universal joint comprising a ball and socket, a shank integrally connecting said ball to said foot member, and a base integrally connected to said socket, and said base being rotatably secured in said other end of the stem whereby said foot member can be rotated for better positioning.

3. The brace of claim 2 wherein said socket includes a slot through which said shank may be moved to permit further adjustment of the position of said foot member.

4. The brace of claim 3 wherein said connection means includes interengageable teeth on said windshield bracket and on said foot member.

5. The brace of claim 4 wherein said windshield bracket includes a floor portion that is separated by a space from the windshield; said teeth on said windshield bracket being formed on said floor portion; and said connecting means further including at least one nut located in said space; said foot member and said floor portions having slots extending therethrough in registry with each other, and at least one bolt extending through said slots for engagement in said nut.

6. The brace of claim 2 wherein said connection means includes interengageable teeth on said windshield bracket and on said foot member.

7. The brace of claim 6 wherein said windshield bracket includes a floor portion that is separated by a space from the windshield; said teeth on said windshield bracket being formed on said floor portion; and said connecting means further including at least one nut located in said space; said foot member and said floor portions having slots extending therethrough in registry with each other, and at least one bolt extending through said slots for engagement in said nut.

8. A brace assembly for placement between a boat windshield structure and a dashboard or the like comprising a brace member adapted to extend between said windshield structure and dashboard at a required angle, a dashboard bracket and means fixedly securing said bracket to said dashboard, a first universal joint interconnecting the dashboard bracket and one end of the brace member including interfitting ball and socket parts and a part having swiveled engagement with one end of the brace member, a windshield bracket and means fixedly securing the windshield bracket to said windshield structure, a foot member, a second universal joint interconnecting said foot member and the other end of said brace member and including interfitting ball and socket parts and a part having swiveled engagement with said other end of the brace member, and adjustable cooperating rigid connection means on said foot member and said windshield bracket allowing such elements to be rigidly secured in selected linear positions of engagement.

9. The brace assembly of claim 8, wherein said adjustable connection means includes interengageable teeth on said windshield bracket and said foot member, and fastener means to clamp said teeth in engagement releasably.

* * * * *